Figure 1:
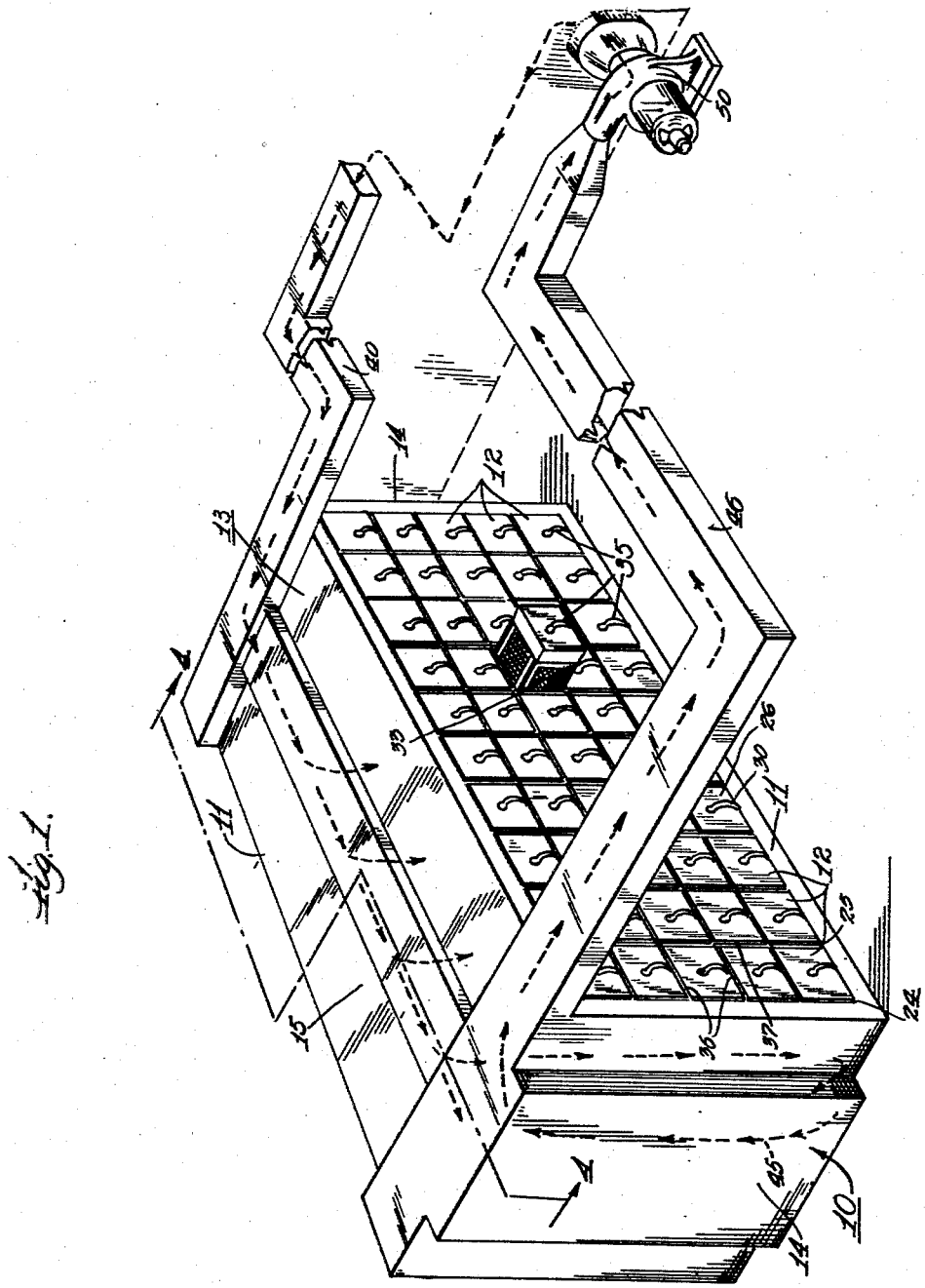

April 23, 1940.  W. McK. BAIRD  2,198,239
REFRIGERATED LOCKER SYSTEM
Filed Jan. 26, 1939  5 Sheets-Sheet 1

Inventor
William McKinley Baird
by James R. McKnight
his Attorney

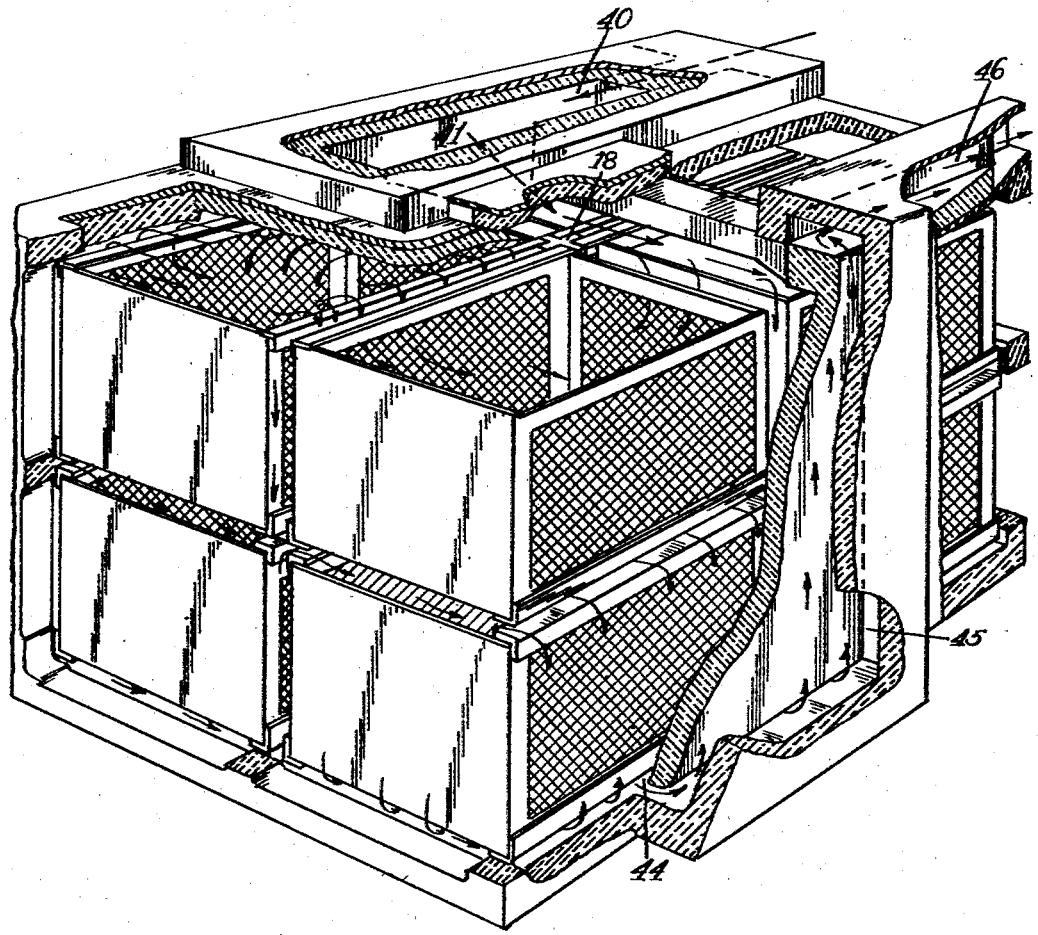

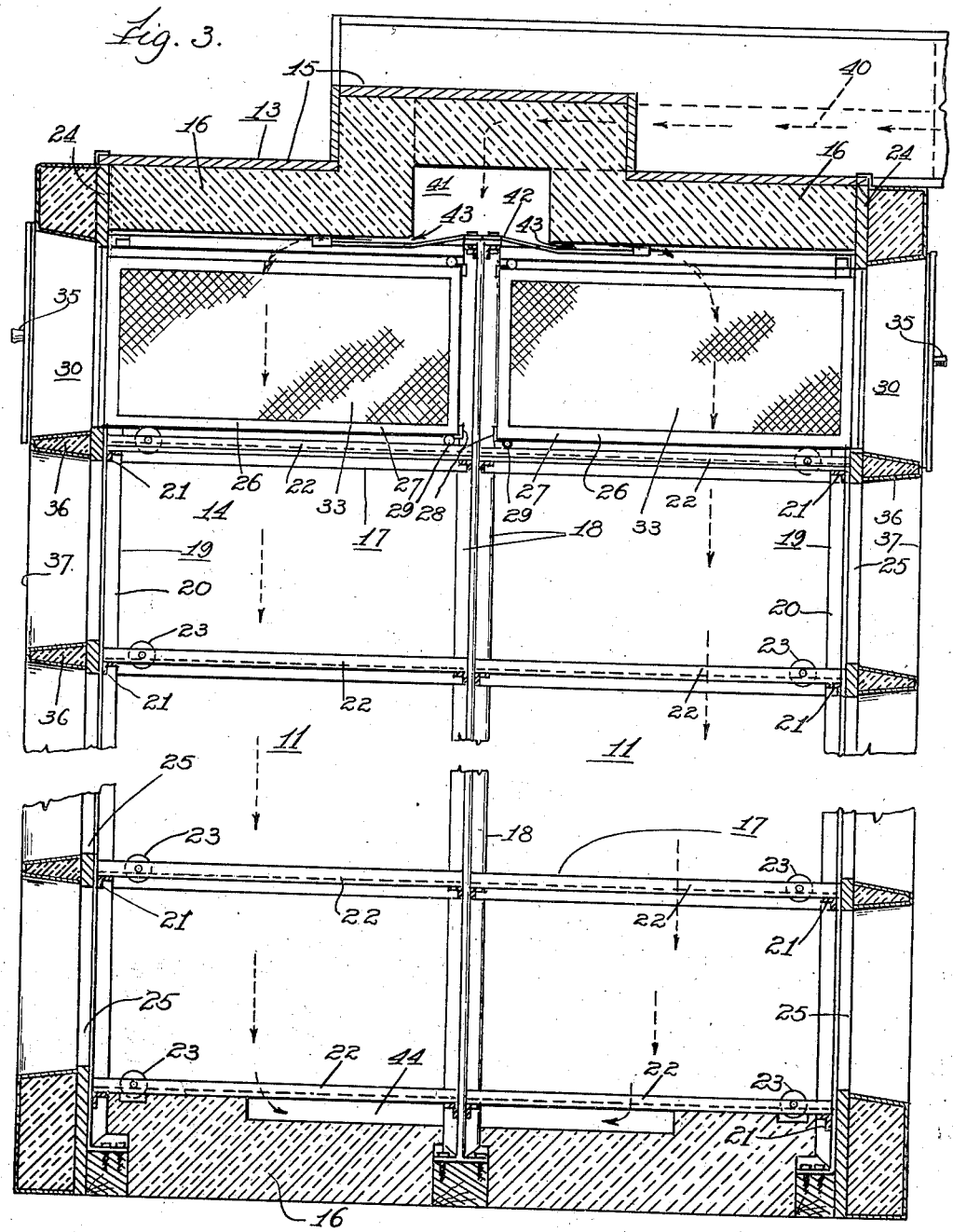

April 23, 1940.  W. McK. BAIRD  2,198,239
REFRIGERATED LOCKER SYSTEM
Filed Jan. 26, 1939  5 Sheets-Sheet 4
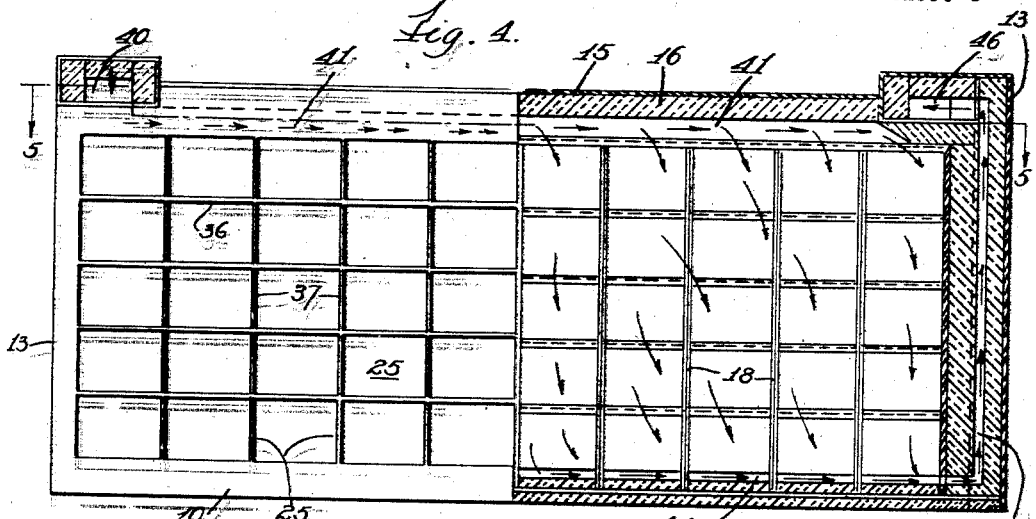
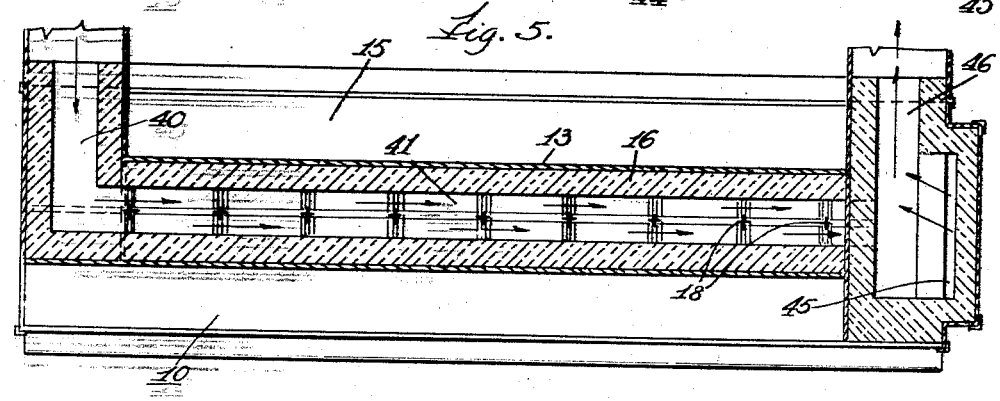
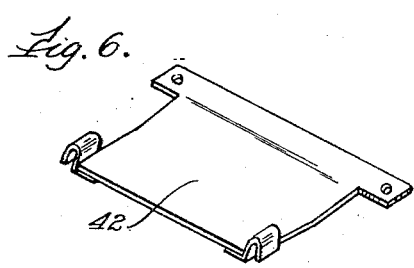
Inventor
William McKinley Baird
by James R. McKnight
his Attorney

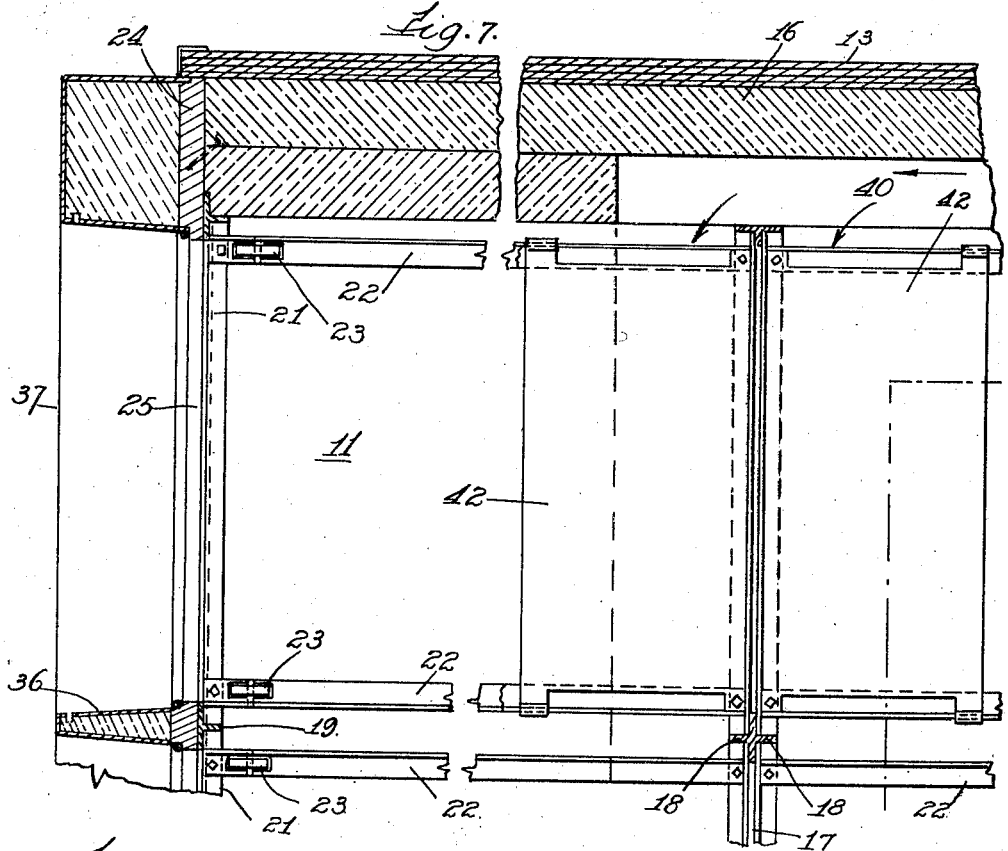
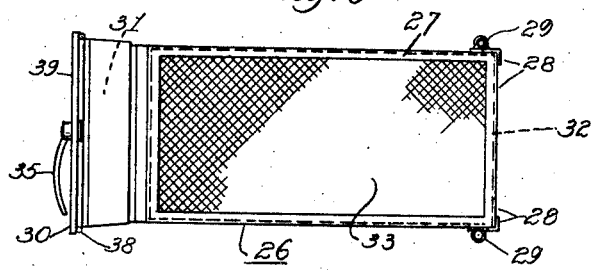
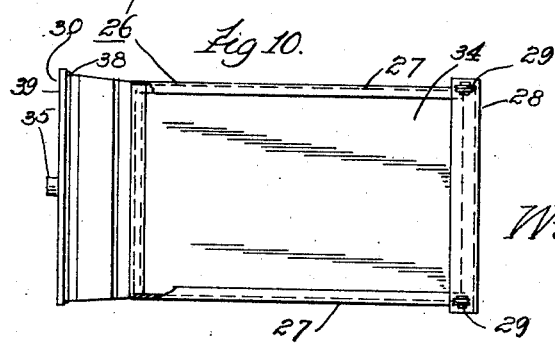

Patented Apr. 23, 1940

2,198,239

UNITED STATES PATENT OFFICE 2,198,239

REFRIGERATED LOCKER SYSTEM

William McKinley Baird, Chicago, Ill.

Application January 26, 1939, Serial No. 252,973

2 Claims. (Cl. 62—89)

In rural communities it has long been a problem for the individual farmer to preserve his meat and other perishable products. Where there are sufficient farmers in a community this problem may be solved by a central refrigerated depot. Heretofore such depots have been ice houses or cold storage places usually refrigerated by blocks of ice and having a plurality of hooks upon which the farmers could place their meat. This type of refrigerated depot required the farmer to enter the same—and in some instances come from a warm temperature to a cold one. There was also great danger by his entrance of contamination of not only his property but of all the others.

Among the objects of my invention is to provide a central refrigerated locker system for the freezing and storage of meat and other perishable commodities and biologicals for use by the owners of the lockers. Another object of my invention is to provide a refrigerated locker system so that the users do not have to enter the system itself but may reach their individual lockers in a normal temperature and from the outside of the system. In this way the user is not only protected against sudden and severe changes in temperature but the products themselves are safe from contamination by the entry therein of foreign matter. My refrigerated locker system has such other objects, advantages and capabilities as will later more fully appear and which are inherently possessed by my invention.

While I have shown in the accompanying drawings a preferred form of my invention yet I wish it understood that the same is susceptible of modification and change without departing from the spirit of my invention.

Referring to the drawings, Fig. 1 is a perspective view of a double unit coupled as diagrammatically shown with a typical refrigerating plant; Fig. 2 is a perspective view of eight containers or lockers of a unit with portions broken away to reveal air ducts and passages in detail; Fig. 3 is a vertical section of a unit showing eight containers or lockers in place; Fig. 4 is a face view on staggered line 4—4 of Fig. 1; Fig. 5 is a top plan view on line 5—5 of Fig. 4; Fig. 6 is a perspective detailed view of one of the splash plates; Fig. 7 is a detailed sectional view of splash plates in position with the drawer of the locker removed; showing the roller tracks; Fig. 8 is a detailed face view of a drawer; Fig. 9 is a side elevation of a drawer; Fig. 10 is a top plan view of a drawer.

The embodiment selected to illustrate my invention discloses a refrigerated locker system 10 having one or more units 11, each unit housing a plurality of lockers 12. My unit 11 may be cooled or refrigerated by suitable connections with any well known refrigeration means. In Fig. 1 the blower 50 of a conventional refrigeration plant is shown. This blower forces air through the refrigeration plant and the cold air is then passed into duct 40 of the unit 11. After the air has passed through the unit 11 it is returned to the blower 50 through exit 46.

Referring more particularly to my unit 11 I prefer to have a double unit with lockers or drawers on either side as clearly shown in Fig. 3 and indicated in Fig. 1.

My double unit comprises a shell 13 of plywood or the like having sides 14 and a top 15. Insulation 16 is suitably attached to the interior walls of the shell 13. My shell 13 is suitably attached to a metal skeleton structure 17. This metal skeleton structure 17 has a central frame 18 which is formed by welding two T angles together or by one X section. Each end of the central frame 18 terminates in a T. A front frame 19 is made up of angles 20. Tie angles 21 extend between and are attached to the front frame 19 and the central frame 18 and form tracks 22. Adjacent the front portions of the tracks, rollers 23 are attached.

The face 24 of shell 13 is cut out to form a plurality of openings 25 suitable to receive drawers 26 which run on tracks 22.

Each of the drawers 26 has a pair of side angles 27 connected by tie or rear angles 28. At the rear of said side angles 27 each of said drawers 26 has a roller 29 adapted to facilitate the movement of the drawer on the tracks 22. Attached to the front ends of the side angles 27 is an imperforate front wall door 30 which has attached to its inner surface suitable insulation 31. Wire mesh is attached to the rear angles 28 to form a rear screen 32, and wire mesh is also attached to the side angles 27 to form side screens 33. A bottom pan 34 is held in place preferably by the same bolts that fasten the rear angles to the side angles. The front edge of the bottom pan may be turned up with the edge turned back and with holes in the turned up portion to receive bolts for attachment to the front wall. Each front wall 30 has a suitable handle 35 containing retaining and locking mechanism.

Insulation is attached to the outer face 24 of the shell 13, said insulation being covered by horizontal 36 and vertical 37 strips. The front face 38 of the drawer 26 extends forwardly so as to be substantially flush with the strips 36 and 37. Each drawer 26 has a gasket 38 attached to the inner edges of a flange 39 on the face 30 so as to seal the drawer upon the same being in closed position.

A preferred form of circulation of cold air for my unit 11 is shown in Fig. 3 wherein the air flows from a duct 40 into channel 41 which extends laterally across the entire width of the unit through the insulation at the top thereof. At the top of each vertical row of drawers 26 is a splash plate 42 attached to the central frame 18 forming a narrow passageway 43 directing the cold air down to, in and around the open portions of the drawers 26 thereby cooling the contents thereof. The air continues downwardly and enters a laterally extending shallow channel 44 adjacent the bottom of the unit and is then directed upwardly in channel 45 to an exit 46.

Having thus described my invention, I claim:

1. A refrigerated locker system comprising a shell, insulation attached to the inner walls of said shell, a metal framework attached to said shell, a plurality of tracks attached to said framework, a plurality of lockers of substantial length, breadth and height slidable on said tracks, said lockers having imperforate front walls, said shell having a plurality of spaced openings to receive said front walls, said front walls having externally manually operable means to permit any of said lockers to be withdrawn from the shell to allow access thereto, said lockers having open mesh rear and side air receiving portions, means for supplying fresh cold air, said shell having an inlet channel extending across its width at the top thereof, a duct connecting said means for supplying cold air with said inlet channel, directing members attached to said framework for directing the cold air down to, in and around the open air receiving portions of said lockers, said shell having an outlet channel adjacent the bottom portion thereof to receive the flow of air after it has passed below the lockers, and an exit conduit communicating with said outlet channel.

2. A refrigerated locker system comprising a shell, insulation attached to the inner walls of said shell, a metal framework attached to said shell, said framework formed of a plurality of spaced angle irons, a plurality of tracks attached to said spaced angle irons, a plurality of lockers of substantial length, breadth and height having imperforate front walls, said lockers slidable on said tracks and spaced from each other so as to leave passageways therebetween, said lockers having open mesh rear and side air receiving portions, said shell having a plurality of spaced openings to receive the front walls of said lockers, said front walls having externally manually operable means to permit any of said lockers to be withdrawn and to allow access to said lockers from outside the shell, said lockers having insulation, means for supplying fresh cold air, said shell having an inlet channel extending laterally across its width at the top thereof and through the insulation, a duct attached at one end to said means for supplying cold air, said duct passing through said shell and communicating at its other end with said inlet channel for passing cold air thereto, splash plates attached to the top of said framework for directing the cold air down to the passageways around said lockers and through the open mesh into said lockers, said shell having a laterally extending shallow outlet channel adjacent the bottom thereof to receive the flow of air after it has passed below the lockers, and an exit conduit communicating at its inner end with the outlet channel and passing out of the shell.

WILLIAM McKINLEY BAIRD.